United States Patent Office 3,465,444
Patented Sept. 9, 1969

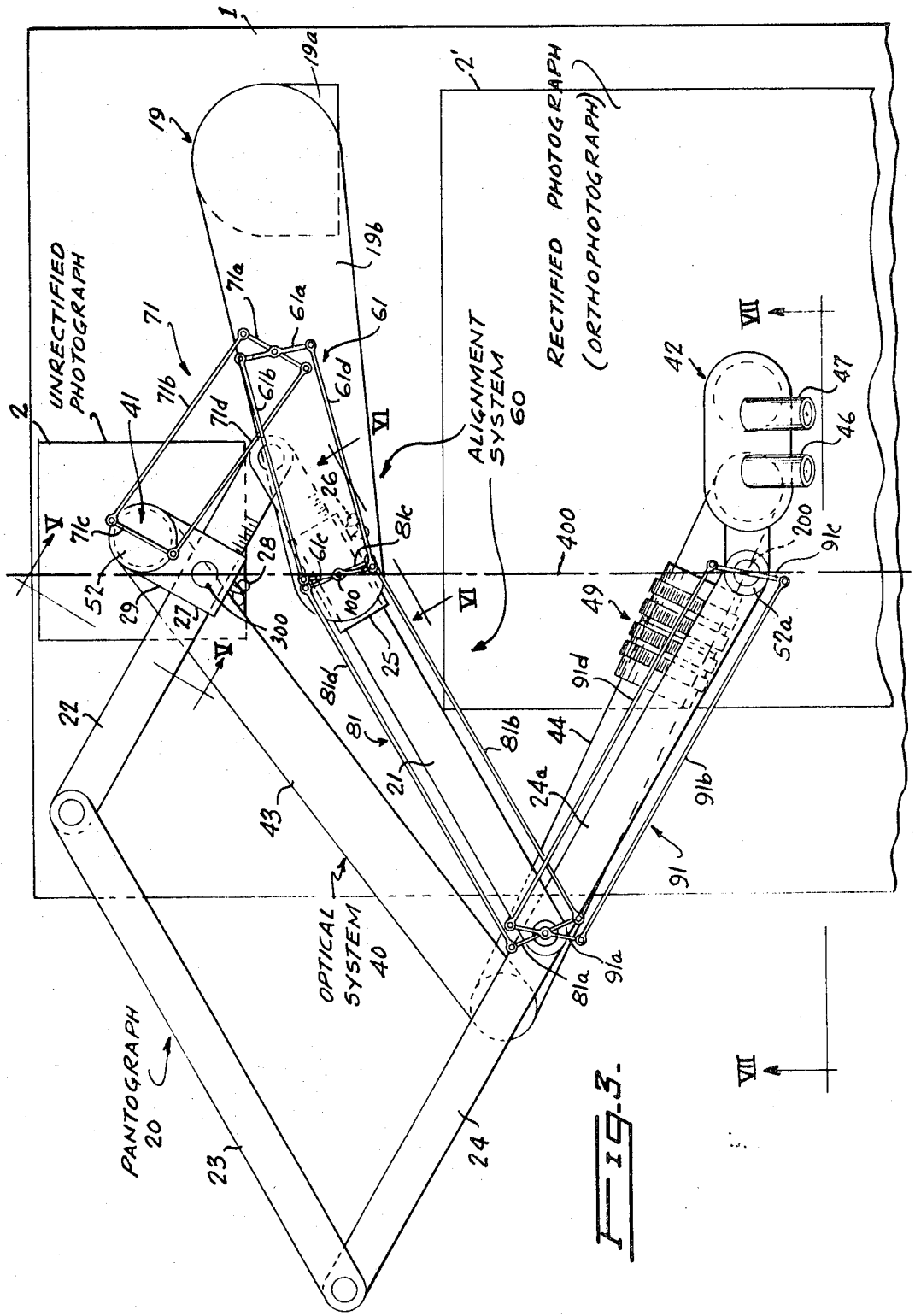

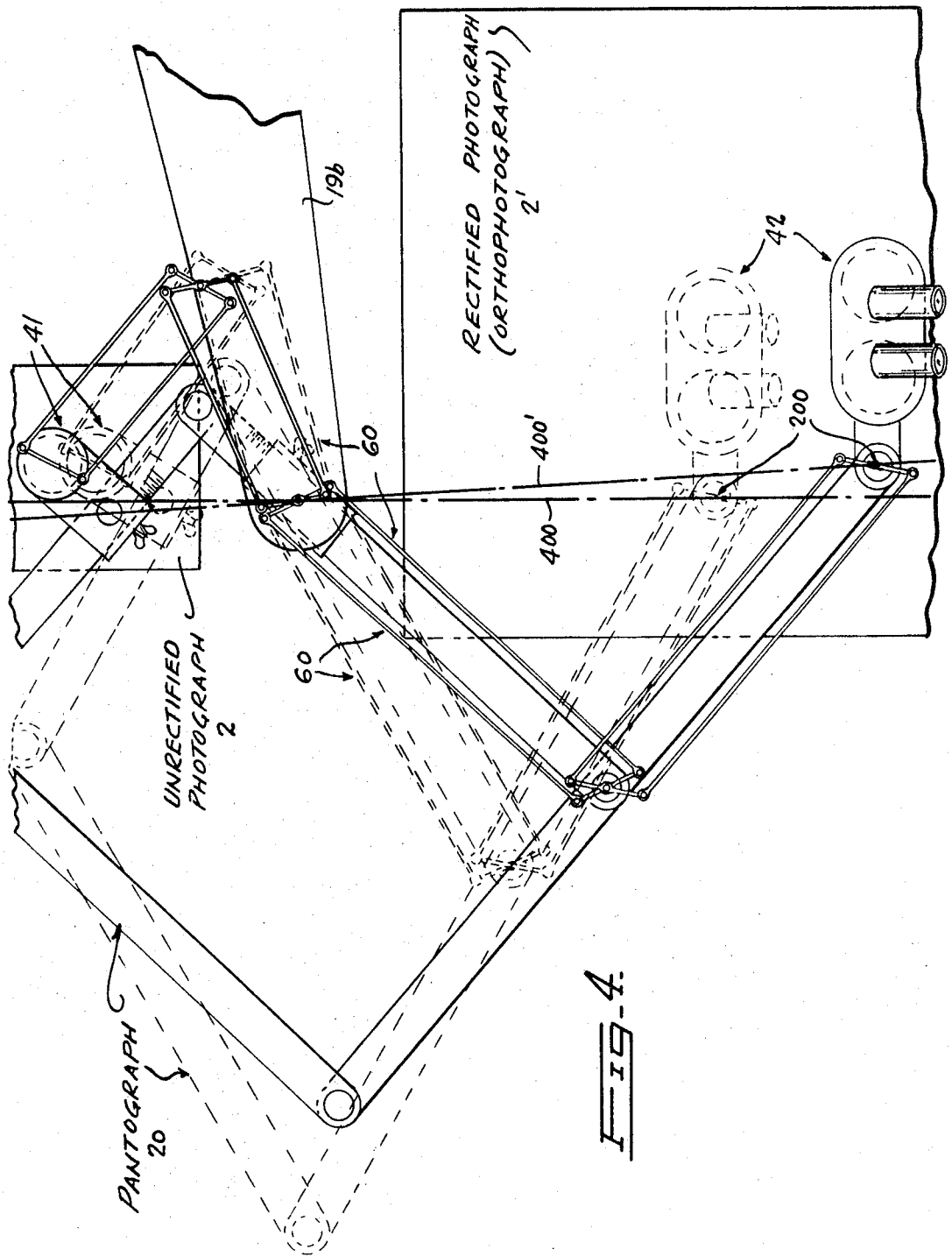

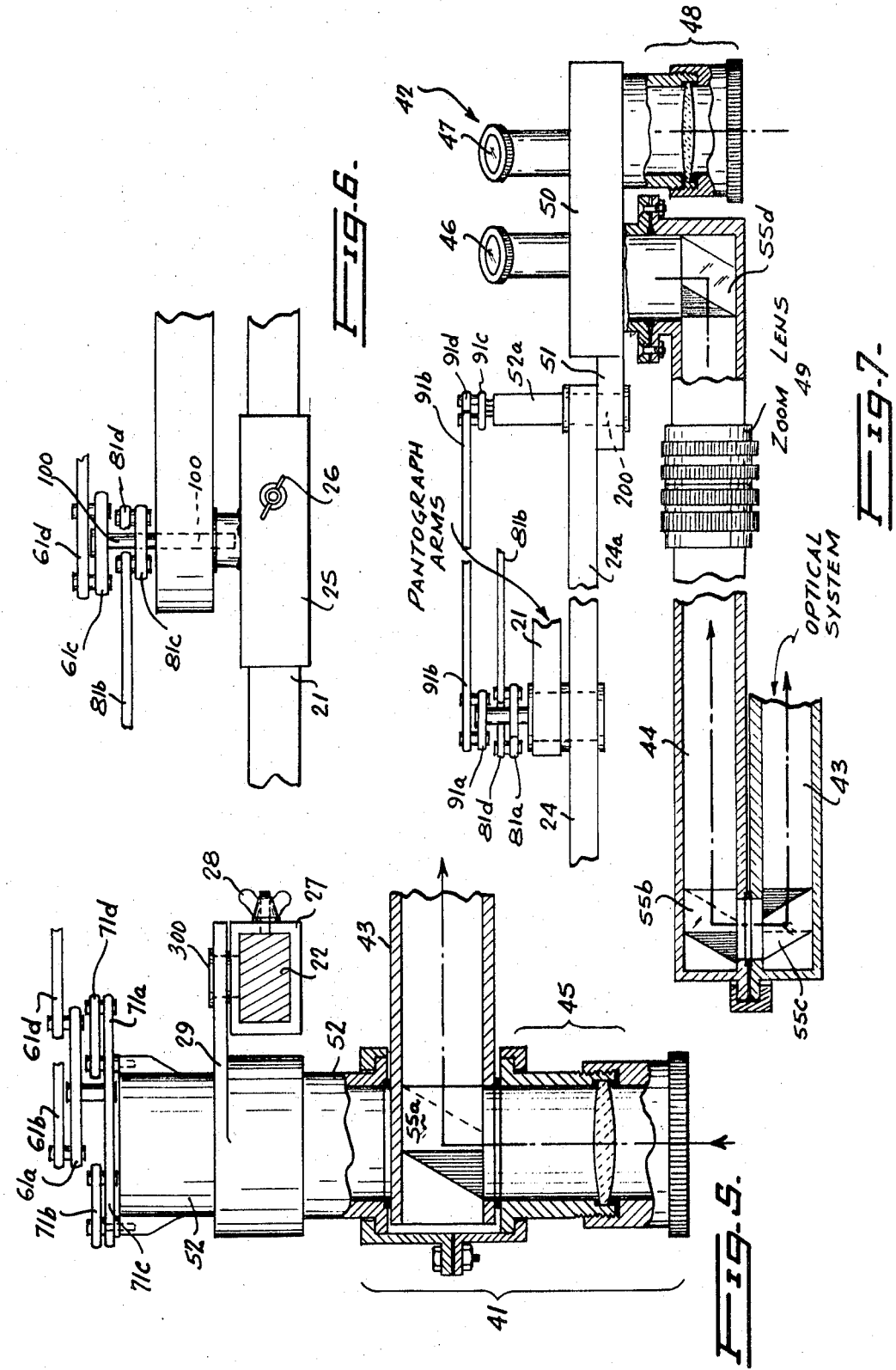

3,465,444
PHOTOGRAMMETRIC METHOD AND
APPARATUS
Theodore J. Blachut and Antoni J. Smialowski, Ottawa,
Ontario, Canada, assignors to Canadian Patents and
Development Limited, Ottawa, Ontario, Canada, a company of Canada
Filed June 5, 1967, Ser. No. 643,449
Int. Cl. B43l 13/16, 13/18
U.S. Cl. 33—20                                    7 Claims

ABSTRACT OF THE DISCLOSURE

A map making method using aerial photographs, two different ones of which are viewed stereoscopically for improved interpretability. One photograph must be rectified (corrected for geometric accuracy), while the other photograph viewed may either be the unrectified version of the first photograph, or may be a rectified or unrectified version of a second aerial photograph that forms a stereo-pair with the first photograph.

The apparatus for viewing the photographs may be a conventional stereoscope, or may consist of a pantograph which carries a binocular optical system, and, by virtue of its master-slave movements and operating ratio, permits stereo viewing of corresponding selected areas of two photographs of different scale.

---

This invention relates to the map-making techniques or mapping applications of photogrammetry, more particularly, to the various techniques based on the use of rectified photographs.

A precisely vertical photograph of a perfectly flat and horizontal terrain provides a geometrically correct picture of the terrain. This means that terrain details, such as roads, property boundaries etc. would retain their exact geometrical form and relative location. Also, there would be a constant ratio between any distance on the photograph and the corresponding distance on the ground. This ratio defines the scale of the photograph.

If, however, the photograph is not taken with the camera looking along an exactly vertical line or the terrain is not exactly flat and horizontal, the photographic picture will be distorted. This means that the angles between corresponding directions on the photograph and on the ground will not be the same, the scale of the photograph will be different, as a rule, in each part of the photograph, and the scale will also depend upon the direction under consideration.

It is obvious that an undistorted photograph can be used as a substitute for a planimetric map. Since, generally speaking, photographs convey a distorted image of the terrain, because the abovementioned strict conditions are not fulfilled, techniques have been developed that permit the "rectification" of photographs. Various procedures may be used for this purpose, the most recent and complete being the so-called orthophoto technique, referred to also as "differential rectification." In this technique, each tiny part of the photographic image is brought into uniform scale so that the entire photographic image is perfectly rectified.

In some applications, rectified photographs (also referred to as photo-maps, photo-plans or orthophotographs) can be used as such without any further processing. There are, however, a multitude of applications in which even the best rectified photograph does not satisfy the basic requirements encountered in the field of mapping. The reason for it is twofold:

(1) In certain applications, it is preferable for the scope of the information provided by the photo-maps to be restricted to selected details only, or for selected details to be made more prominent.

(2) Precise ground outline of the details is required.

Rectified photographs or photo-maps do not meet these requirements. They contain all the features that are recorded on the photographic image. Also, the ground outline of the various features is not always clear or even visible. For example, one can quite readily recognize from a photo-map where the limit of the pavement of a highway is, but determination of the boundary between the highway shoulder and the ditch may be very difficult. Even more difficult may be establishing the ground outline of a building. As a rule, one can see the building on the rectified photograph in an oblique perspective showing only the roof and one or two sides of the building. The other sides of the building are obscured by its own image and consequently it is often extremely difficult to decide where the complete ground outline of the building lies.

The present invention provides a solution to these difficulties by introducing stereo-viewing into the observation of the photographs and their further processing. By so doing, the interpretability of the photo image becomes radically improved, in the sense that an object that may not be recognizable on a single photograph becomes easily readable under stereo viewing. In addition many features that are obscured on a single photograph can be detected in stereo observations. In particular the hidden ground outlines of features such as buildings can be mostly reliably determined by improved general interpretability, for example by analyzing the characteristic form of the roof which stands out when viewed stereoscopically.

This invention provides a method and means for stereo viewing a pair of photographs at least one of which is rectified, with simultaneous facilities for drawing or marking selected details. The rectified photograph can be viewed either together with the original photograph from which the rectified photograph was made, or preferably with the second photograph of a stereo pair of photographs, itself either an original or rectified.

The invention may be defined as a method of making a map showing terrain detail of a selected area, said method comprising (a) optically juxtaposing for stereoscopic viewing two different aerial photographs of said selected area, at least one of said photographs being a rectified photograph,
(b) viewing said two optically juxtaposed photographs simultaneously,
(c) and, while so viewing, marking over said rectified photograph terrain detail discernible from the simultaneous stereoscopic viewing of both said photographs.

If the two viewed photographs are not at the same scale, optical magnification may be incorporated in the optically juxtaposing step (a) to bring them effectively to the same scale.

The present inventive advance in map-making may also be embodied in apparatus form, to provide an apparatus whereby two aerial photographs are optically juxtaposed for stereoscopic viewing, such that the detail which becomes discernible from this simultaneous stereoscopic vi comes discernible from this simultaneous stereoscopic viewing can be used to draw an accurate map.

Specifically, the present invention may be embodied in a device comprising: a pantograph mechanism including three support members; main support means; means pivotally connecting a first of said pantograph support members to said main support means to support the pantograph mechanism and locate said first support member thereof, said pantograph mechanism including means for transforming a master movement of a second of said support members relative to said first support member to a corresponding slave movement of the third of said support members relative to said first support member; and an optical system supported by said pantograph mechanism, said optical system including a binocular viewing head supported by said second support member, an objective head supported by said third support member and means defining an optical path between said objective head and a first eyepiece of said binocular viewing head for optically juxtaposing for stereoscopic viewing two photographs located respectively below said objective head and below the second eyepiece of said binocular viewing head.

The instrument can also be used for interpreting and editing photo-maps. In many applications, the interpretation of photo-maps can be restricted to a limited number of details only. For example, for legal survey purposes, the property boundaries would be of particular interest and could be drawn either directly on the rectified photograph or using a tracing sheet placed over the rectified photograph. By thus drawing all details that constitute the contents of a map in conjunction with a continuous stereoviewing, a novel technique for basic mapping is provided. When drawing the map directly on the rectified photograph, any undesired photographic images can be removed by a bleaching process, or a line map can be drawn directly on a transparent overlay. While these latter procedures are in themselves already known in photogrammetric operations, the approach of the present invention is superior by virtue of introducing stereo-perception into the drafting process. In this way a similar effect is achieved as is obtained with conventional photogrammetric plotters, but by significantly simplified means. It is anticipated that this new technique will find wide application, particularly in quickly establishing basic maps for large unmapped territories, in the revision of existing maps, and in many specialized areas, such as legal surveys.

Although equivalent structures are possible, it is preferable to employ the pantograph mechanism described above, because of its mobility combined with an assurance of the desired master-slave relation in movement. Furthermore, a pantograph mechanism is readily adjustable to provide various ratios of master to slave movement. This latter feature makes the pantograph suitable for use with differently scaled photographs, optical magnification means being provided to permit effective viewing of the photographs at the same scale. As will be discussed later, either photograph may be the larger in scale, and it is to be understood that with respect to the present invention the optical magnification may be positive (enlargement) or negative (diminution). The form of magnification most frequently will be positive, i.e., optical enlargement of one of the photographs.

These and other features of the invention will become apparent in more detail from the following disclosure of examples of the present invention described with reference to the accompanying drawings. The drawings are provided by way of illustration of the invention only, and show the following:

FIGURE 3 is a plan view showing a preferred embodiment for carrying out the present invention;

FIGURE 4 is a plan view showing the preferred embodiment of FIGURE 3, in a second position;

FIGURE 5 is an elevation view, partly in section, taken along line 5—5 of FIGURE 3, and showing structural features of the objective head of the preferred embodiment;

FIGURE 6 is an elevation view taken along line 6—6 of FIGURE 3, showing how the preferred embodiment is supported; and FIGURE 7 is an elevation view, partly in section, taken along line 7—7 of FIGURE 3, showing the viewing head of the preferred embodiment of the present invention.

When viewed together, FIGURES 5 and 7 show the entire optical system of the preferred embodiment.

Figure 1:
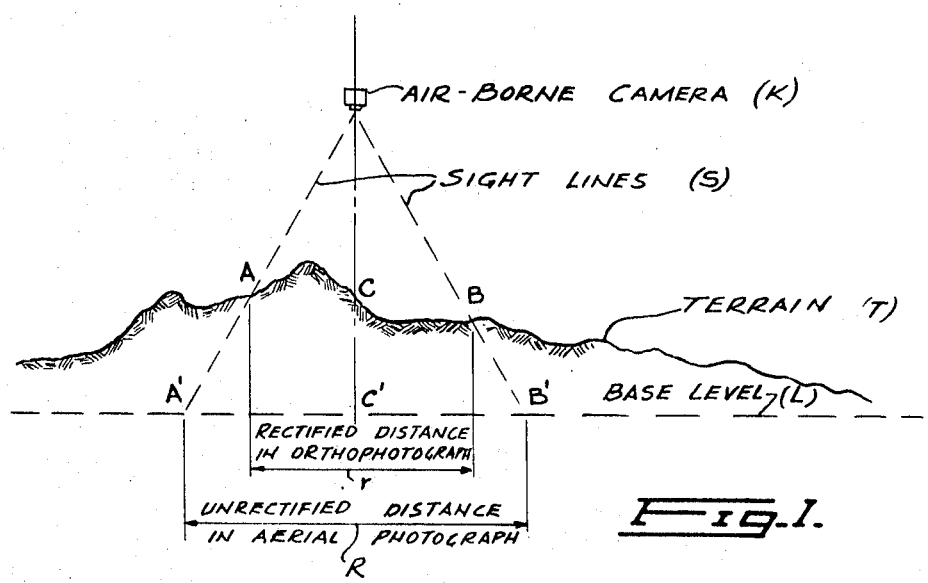
FIGURE 1 is a diagram, in elevation, showing how horizontal distortion occurs in aerial photographs.

By way of additional background explanation, it should be stated that distortion of horizontal detail may occur in the following way. With reference to FIGURE 1, an aircraft (not shown) carries a camera K which takes pictures of the terrain T of a selected area. Letters A, B and C refer to different points or locations at ground level, and each is at a different elevation. A broken horizontal line L indicates a base level. This base level is commonly taken to be sea level, although any desired datum level may be used. The inclined broken lines S represent lines of sight between the camera K and points A, B and C at ground level, and corresponding points A', B' and C' at the base level L.

As seen in FIGURE 1, the distance A' to B' is shown as R and is the apparent distance at base level L, between the ground level points A and B, as seen by the camera K. That is, R is the unrectified distance between points A and B in the actual aerial photograph. The correct, or rectified straight line distance between points A and B is shown as r. Only the point C which is directly below the camera K will appear along the base level L in its correct geometric location. In this instance, FIGURE 1 shows the actual, or rectified distance r to be less than the apparent or unrectified distance R. However, if the elevation of the base level L were higher than points A, B and C, these points being in a valley, the distance r would be greater than the distance R.

The above discussion relating to FIGURE 1 has assumed the camera K to be held horizontally. In actual practice this is difficult to achieve. If the camera is not held truly horizontally, distortion of the horizontal detail will inevitably occur in the aerial photographs, even if the terrain were flat and all at the base level. For this reason there has been developed the technique of rectifying (correcting) original aerial photographs to compensate for distortion of horizontal detail. Various methods are known for correcting aerial photographs to produce rectified photographs, and no further discussion of the techniques employed is deemed necessary herein, since such details are not pertinent to the present inventive advance.

In the practice of aerial photography, an aircraft flies over and photographs the area to be mapped. Either a single camera, or a pair of cameras laterally spaced apart, may be used to take a series of aerial photographs, and such photographs commonly overlap, often by more than 50%. Any two such overlapping photographs may be considered as a "stereo-pair" of photographs of the common area, and for ease of reference either photograph of such a stereo-pair will be referred to as the "stereo-mate" of the other.

Figure 2:
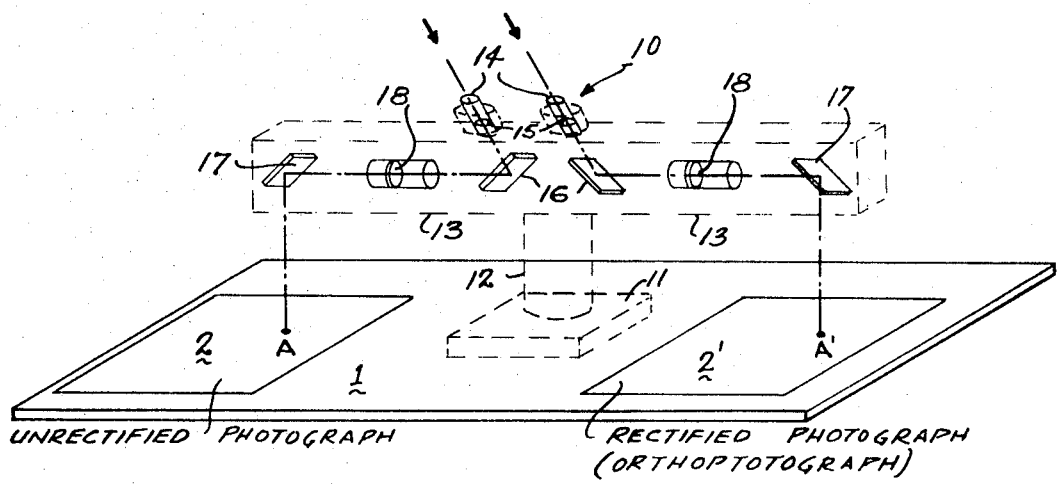
FIGURE 2 is an elevation view, in perspective, showing one embodiment for carrying out the present invention.

The present invention may be carried out using the basic embodiment illustrated in FIGURE 2. In this instance a simple portable stereoscope 10 is placed upon a suitable flat surface 1, the latter being a drafting table, desk or the like. The stereoscope 10 comprises a base 11, an upright supporting member 12 secured thereto, and a pair of oppositely extending arms 13 fixed to said supporting member 12. A pair of ocular eye-piece assemblies 14 is mounted at the centre of the stereoscope 10, these two assemblies 14 together forming a binocular viewing head. Basically, each eye-piece assembly consists of a lens 15 and a reflecting mirror 16. To cooperate with each eye-piece assembly 14 another mirror 17 is mounted adjacent the free end of each of arms 13. The ocular eye-piece assemblies and the mirrors 17 are to be considered as constituting an optical system.

To use the device of FIGURE 2 to make a topographical map, two photographs 2 and 2' are placed on opposite sides of the stereoscope 10, beneath each of the mirrors 17. The photograph 2 is an unrectified aerial photograph while the photograph 2' is the rectified version of the stereo-mate of photograph 2. Each photograph is at the same scale and is assumed to show the same area. The stereoscope 10 serves optically to juxtapose the photographs 2 and 2' side-by-side in a stereoscopic relationship, so that when a draftsman looks through the binocular viewing head of the stereoscope 10, he simultaneously and stereoscopically views the photographs 2 and 2'.

The effect is that the definition of many details is significantly improved, and, of particular importance, the ground lines of the details to be plotted become clearly visible. Using stereo viewing even ground lines obscured partly by the terrain objects themselves can be located with astounding accuracy. To draw a map, the draftsman now marks directly on the rectified photograph the image detail (e.g. road edges, river banks, railway tracks) that he is able to recognize. It is to be clearly understood that, while the unrectified photograph 2 is used to aid in identifying the terrain detail, only the rectified photograph 2' is used in finally locating such detail. This is important, since, by definition, the unrectified photograph is erroneous in geometrical detail location, and is used only to achieve stereo-perception and in addition to overcome the possible shortcomings of the rectified photograph in relation to clarity. While the map may be drawn directly on the orthophotograph 2' itself, it may, if preferred, be drawn on a tracing sheet placed over the orthophotograph 2', such tracing sheet either being blank or printed with some or all of the contents of the orthophotograph 2'.

As the stereoscope 10 is moved relative to the photographs 2 and 2', or these photographs are moved relative to the stereoscope, in order to view the terrain detail of the different areas, such detail can be mapped directly onto the rectified photograph 2' or onto a tracing sheet placed thereover to form the final map. Conventional drafting equipment (not shown) may be used to aid in drawing the terrain detail onto the orthophotograph 2'.

In a modification of the basic apparatus shown in FIGURE 2, a lens system 18 may be utilized in the optical system, said lens system affording adjustable magnification of an image passing therethrough. Such a modified device is operable in precisely the same manner as described above, except that, in addition, it provides compensation for any difference in the scale of the photographs 2 and 2'. The actual location of the lens system 18 is optional. It may be positioned as shown in FIGURE 2, or it may be associated with either of the mirrors 17, or with one of the eye-piece assemblies 14.

In using photographs of different scales, it is a matter of choice which of the photographs is at the larger scale. In some instances it may be preferable to use an enlarged unrectified photograph at 2, in order to make visible finer terrain detail, in which case it will be the optical path to the rectified photograph that will include the magnification system. On the other hand, it may be preferable to make the map on a photograph 2' that has been enlarged, as well as rectified, thus enabling a larger scale map to be made without the need to enlarge both photographs of the stereo-pair, the unrectified photograph then being enlarged only optically for viewing stereoscopically with the rectified photograph.

FIGURE 2 is, of course, diagrammatic in not showing an enclosed optical system, i.e., shielded from light extraneous to the illumination of the photographs 2 and 2', a feature that would be present in an actual instrument.

A preferred embodiment for carrying out the present invention is shown in FIGURES 3 to 7.

With reference to FIGURE 3, a drafting surface 1, assumed to be horizontal, is fixedly provided with a main support means 19 comprising an upright supporting member 19a, to which is secured a generally horizontally extending support arm 19b. A first support member, a pivot pin 100 (see also FIGURE 6), is pivotally supported at the free end of the support arm 19b.

A pantograph mechanism 20 consists of four arms 21, 22, 23 and 24 pivotally secured one to the next to form a parallelogram structure. A first pantograph arm 21 extends through and is slidably supported by a slider 25 (FIGURE 6). The slider 25 is fastened to the pivot pin 100 and thereby supports the whole of the pantograph mechanism 20 for both pivotal and slidable movement relative to the main support means 19. A locking screw 26 serves to prevent relative sliding motion between the slider 25 and the arm 21.

A second pantograph arm 22 has a second slider 27 (FIGURE 5) slidably secured thereto, and a locking screw 28 (similar to the locking screw 26) locks the arm 22 and the slider 27 together. An extension member 29 is secured to the slider 27 by means of a third support member, a pivot pin 300, so that the extension member 29 is movable both pivotally and slidably relative to the pantograph arm 22. Both of the pantograph arms 21 and 22 have scales marked or attached on them to indicate the exact location of the sliders thereon.

A fourth pantograph arm 24 has an extended portion 24a and a second support member, a support pin 200 (FIGURE 7), pivotally mounted at the free end of the extended portion 24a.

The pantograph mechanism 20 is such that the sliders 25 and 27 can be so arranged that the axes of the pivot pins 100, 200 and 300 are positioned so as to lie in a common plane signified by the broken line 400 (FIGURE 3). When the pantograph mechanism 20 is moved from one position to another (as in FIGURE 4) the axes of the pins 100, 200 and 300 will continue to be in a common plane. FIGURE 4 shows the pantograph mechanism 20 in two such positions. The broken lines in FIGURE 4 show the pantograph mechanism 20 in a first position (the same position as in FIGURE 3), while the full lines show the pantograph mechanism 20 in a second position, with the common plane of the pin axes shifted to 400'.

An optical system 40 is supported by the pantograph mechanism 20 in a manner to be discussed below. Basically, the optical system 40 comprises an objective head 41 (FIGURES 3 and 5), a binocular viewing head 42 (FIGURES 3 and 7), and tubular members 43 and 44 (FIGURES 3, 5 and 7) which define an optical path connecting the objective and viewing heads together.

With reference to FIGURE 5, the objective head 41 comprises a lens portion 45 rigidly connected to a support element 52 which is rotatably secured to the extension member 29 of the slider 27, whereby the objective head 41 is ultimately supported by the pantograph arm 22.

The optical path defined by the tubular members 43 and 44 also includes four prisms 55a, 55b, 55c, and 55d, fixedly mounted in said tubular members. Prism 55a is mounted (FIGURE 5) in the tubular member 43 and reflects an image seen by the objective head 41 on to the prism 55b. As seen in FIGURE 7, the prisms 55b and 55c are mounted above each other in the tubular members 44 and 43 respectively, which latter are pivotally connected relative to each other. These prisms serve to transmit the image on towards the prism 55d which finally reflects the same up into an eye-piece 46 of the binocular viewing head 42. A second eye-piece 47 of this head is connected to a lens portion 48, and together with eye-piece 46 permits stereoscopic viewing of the photographs 2 and 2' through the binocular viewing head 42. To complete the optical system, a steplessly adjustable magnifying lens 49 (commonly known as a "zoom" lens) is mounted in the tubular member 44 adjacent to the viewing head 42, for convenience. Magnifying lens 49 may, alternatively, be replaced by a combination of replaceable magnifying lenses, or a suitable equivalent, and may be mounted in any suitable location within optical system 40.

The viewing head 42 also includes a body portion 50 (FIGURE 7) and an extension 51 integral therewith. The eye-piece assemblies 46 and 47 are supported by the body portion 50, as is the lens portion 48. The end of the tubular member 44 is pivotally supported by the body portion 50. The extension 51 is rigidly connected to the pivot pin 200, which in turn is pivotally mounted at the free end of the extension 24a of the pantograph arm 24, as previously described. An upright cylindrical support element 52a is also rigidly secured to the pivot pin 200, and is similar in structure to the support element 52 which supports the objective head 41 (FIGURE 5).

An alignment system 60 (FIGURE 3) is provided to maintain the optical system 40, and in particular the objective and viewing heads 41 and 42, in constant orientation relative to the main support means 19, the drafting surface 1 and photographs 2 and 2'. The alignment system 60 consists of four parallelograms 61, 71, 81 and 91 which are constructed as follows.

The parallelogram 61 comprises a first cross arm 61c rigidly connected to the pivot pin 100 (FIGURE 6), and long arms 61b and 61d which pivotally attach the ends of the first cross arm to the ends of a second cross arm 61a. The latter is rigidly connected to a first cross arm 71a of the parallelogram 71. The ends of the cross arm 71a are also attached, pivotally, to the ends of a second cross arm 71c by means of long arms 71b and 71d. Cross arm 71c is rigidly connected to the objective head 41 by means of the support element 52 (FIGURE 5).

In a similar manner, the parallelogram 81 comprises a first cross-arm 81c rigidly connected to the pivot pin 100 (FIGURE 6), and long arms 81b and 81d which attach the ends of the cross-arm 81c to the ends of a second cross-arm 81a. The latter is rigidly connected to a first cross-arm 91a of the parallelogram 91. The ends of the cross-arm 91a are also attached, pivotally, to the ends of a second cross-arm 91c, by means of the long arms 91b and 91d. The cross-arm 91c is rigidly connected to the viewing head 42 by means of the support element 52a (FIGURE 7).

It may be seen, therefore, that when the pantograph mechanism 20 and with it the optical system 40 are moved from one position to another (FIGURE 4), the orientation of the objective and viewing heads 41 and 42, in relation to the edges of the photographs 2 and 2', will remain constant by virtue of the combination of the pivotal and rigid interconnections of each with its respective parallelogram.

For a master movement of the viewing head 42, controlled manually by the draftsman, the pantograph mechanism 20 ensures that the objective head 41 will make a corresponding, but inverted, slave movement at a scale ratio determined by the distance between the axes of pins 100 and 200 compared with the distance between the axes of pins 100 and 300. This scale ratio must of course be the same, or very nearly so, as the ratio of the scale of the photographs 2 and 2'. For example, if the distance between the axes of pins 100 and 200 is three times the distance between the axes of pins 100 and 300, then the ratio of master-slave movement will be 3:1, and it would follow that the scale of photographs 2 and 2' would have to be substantially 3:1. Accordingly, it will be convenient to mark the scales associated with the pantograph arms 21 and 22 (FIGURE 3) in such a manner that positioning of the sliders 25 and 27 will quickly indicate what the ratio of master-slave movement will be. At the same time the parallelograms 61, 71, 81, 91 ensure that the geometric orientation of each of the objective and viewing heads 41 and 42 remains the same.

To use the apparatus of FIGURES 3 to 7, photographs 2 and 2' are placed on the drafting surface 1 (FIGURE 3), beneath the objective and viewing heads 41 and 42 respectively. These photographs 2 and 2' will be aligned at 180° to one another to compensate for the inverted action of the pantograph mechanism 20, and such that each shows the same area of the terrain to be mapped. A draftsman will then be able to look into the eye-pieces 46 and 47 of the viewing head 42, one eye seeing the unrectified photograph 2 magnified by the lens 49 to the scale of the rectified photograph 2', while the other eye simultaneously sees the rectified photograph 2'. To make the desired map, the draftsman merely draws the detail discernible from the unrectified photograph 2 onto the rectified photograph 2' in the same way as has already been described with reference to FIGURE 2.

After one area has been mapped, the viewing head 42 is moved to a new location, and, because of the master-slave relation therebetween, the objective head 41 makes a similar and corresponding movement to the same, new location. Since the viewing head 42 comprises two eye-piece assemblies, i.e., it is a binocular viewing head, it must always be maintained in the same orientation (horizontally in FIGURES 3 and 4). Similarly, since the objective head 41 often may have cross-hairs or scales (not shown) built into it, it too should preferably be maintained in the same orientation, this being the same as for the viewing head. Mechanical means (not shown) may be provided for rotating or translating either or both of the photographs 2, 2' relative to the surface 1.

The apparatus of FIGURES 3 to 7 is to be considered as illustrative only, with other equivalent structures being possible within the scope of the present invention wherein the particular advantages and features which characterize each of a rectified and an unrectified photograph are simultaneously combined for utilization in a manner not previously known. Therefore, this invention intends to encompass not only those embodiments specifically described herein, but also those equivalent devices which permit the optical juxtapositioning of two aerial photographs, one being a rectified photograph, such that upon simultaneous stereoscopic viewing of said photographs, a draftsman may see a visual representation having discernible image detail simultaneously with accurate geometric detail, from which information a map can readily be drawn.

As indicated above, the first one of the two stereoscopically viewed photographs must be a rectified photograph. In the preferred method of carrying out the invention, the other viewed photograph is a second unrectified aerial photograph that forms a stereo-pair with the unrectified aerial photograph from which the first rectified photograph was formed. This combination is preferred, because it avoids the expense of rectifying both photographs, while achieving satisfactory detail readability. However, it is nevertheless within the scope of the invention that the second viewed photograph may be a rectified version of the second aerial photograph. Yet a third possibility, which is generally less preferred, as normally tending not to yield quite such good readability, is not to use a true stereo-pair of photographs at all, but instead to use as the second viewed photograph the unrectified aerial photograph itself from which the first viewed photograph was formed, a certain measure of stereoscopic effect being achieved from the differences introduced into these two viewed photographs by the rectification of one of them. This third alternative obviously has the advantage that it is usable in circumstances in which only a single aerial photograph, rather than a true stereo-pair of original aerial photographs, is available.

We claim:
1. A device for use in map-making, comprising,
  (a) a pantograph mechanism including three support members;
  (b) main support means;
  (c) means pivotally connecting a first of said pantograph support members to said main support means to support the pantograph mechanism and locate said first support member thereof;
  (d) said pantograph mechanism including means for transforming a master movement of a second of said support members relative to said first support member to a corresponding slave movement of the third of said support members relative to said first support member;

(e) and an optical system supported by said pantograph mechanism, said optical system including a binocular viewing head supported by said second support member, an objective head supported by said third support member and means defining an optical path between said objective head and a first eye-piece of said binocular viewing head, for optically juxtaposing for stereoscopic viewing two photographs located respectively below said objective head and below the second eye-piece of said binocular viewing head.

2. A device according to claim 1, wherein said optical system includes lens means for adjustably magnifying an image transmitted therethrough.

3. A device according to claim 1, further comprising alignment means interconnecting said main support means and said binocular vewing head for maintaining constant orientation of said viewing head during movement thereof with the pantograph mechanism.

4. A device according to claim 1, further comprising alignment means interconnecting said main support means and said objective head for maintaining constant orientation of said objective head during movement thereof with the pantograph mechanism.

5. A device according to claim 1, further comprising first and second alignment means, said first alignment means interconnecting said main support means and said binocular viewing head for maintaining constant orientation of said viewing head during movement thereof with the pantograph mechanism, and said second alignment means interconnecting said main support means and said objective head for maintaining constant orientation of said objective head during movement thereof with the pantograph mechanism.

6. A device according to claim 2, wherein said pantograph mechanism comprises four pantograph arms pivotally connected together in a parallelogram, one of said arms having an extension, means slidingly connecting said first support member with another of said arms, means mounting said second support member on said extension for pivotally supporting said viewing head relative to said extension, and means slidingly connecting said third support member with a further one of said arms for pivotally supporting said objective head relative to said further arm.

7. A device according to claim 6, further comprising first and second alignment means, said first alignment means interconnecting said main support means and said binocular viewing head for maintaining constant orientation of said viewing head during movement thereof with the pantograph mechanism, and said second alignment means interconnecting said main support means and said objective head for maintaining constant orientation of said objective head during movement thereof with the pantograph mechanism.

References Cited

UNITED STATES PATENTS 1,875,363 9/1932 Aldis.
2,847,906 8/1958 Santoni.
2,951,417 9/1960 Reeder et al.

WILLIAM D. MARTIN, Jr., Primary Examiner

U.S. Cl. X.R.
33—1; 350—136